(12) United States Patent
Doglioni Majer

(10) Patent No.: US 7,615,953 B2
(45) Date of Patent: Nov. 10, 2009

(54) APPARATUS AND PROCESS FOR CONTROLLING AND ADJUSTING THE OPERATING OF ELECTRIC MOTOR ACTUATED DEVICES

(75) Inventor: Luca Doglioni Majer, Carate Urio (IT)

(73) Assignee: Rhea Vendors S.p.A., Caronno Pertusella (VA) (IT)

( * ) Notice: Subject to any disclaimer, the term of this patent is extended or adjusted under 35 U.S.C. 154(b) by 0 days.

(21) Appl. No.: 11/996,304

(22) PCT Filed: Jul. 26, 2006

(86) PCT No.: PCT/IB2006/002042

§ 371 (c)(1),
(2), (4) Date: Mar. 13, 2008

(87) PCT Pub. No.: WO2007/012949

PCT Pub. Date: Feb. 1, 2007

(65) Prior Publication Data

US 2008/0191651 A1    Aug. 14, 2008

(30) Foreign Application Priority Data

Jul. 27, 2005    (EP) .................................. 05425552

(51) Int. Cl.
*G05B 5/00*    (2006.01)
(52) U.S. Cl. ..................... 318/449; 318/453; 318/459
(58) Field of Classification Search ................. 318/449, 318/453, 459, 455, 448; 700/244
See application file for complete search history.

(56) References Cited

U.S. PATENT DOCUMENTS

2005/0060063 A1 *    3/2005    Reichelt et al. ............. 700/244

OTHER PUBLICATIONS

Patent Abstracts of Japan, vol. 012, No. 072 (E-588), Mar. 5, 1988 & JP 62 213594 A (Fuji Electic Col. Ltd). Sep. 19, 1987.
Patent Abstracts of Japan, vol. 018, No. 369 (E-1576), Jul. 12, 1994 & JP 06 098594 A (Hitachi Ltd; others: 01). Apr. 8, 1994.
Patent Abstracts of Japan, vol. 018, No. 320 (E-1563), Jun. 17, 1994 & JP 06 070593 A (Hitachi Ltd; others: 01). Mar. 11, 1994.
Patent Abstracts of Japan, vol. 2003, No. 12, Dec. 5, 2003 & JP 2003 284381 (Sumitomo Heavy Ind. Ltd). Oct. 3, 2003.
Patent Abstracts of Japan, vol. 2000, No. 22, Mar. 9, 2001 & JP 2001 136787 A (Hitachi Ltd). May 18, 2001.
Patent Abstracts of Japan, vol. 1996, No. 02, 29 Feb. 196 & JP 07 274587 A (Hitachi Ltd; others:01). Oct. 20, 1995.
Patent Abstracts of Japan, vol. 1996, No. 07, Jul. 31, 1996 & JP 08 066078 A (Fuji Electric Co Ltd). Oct. 8, Mar. 1996.

* cited by examiner

*Primary Examiner*—Karen Masih
(74) *Attorney, Agent, or Firm*—Hess Patent Law Firm, PC; Robert J. Hess

(57) ABSTRACT

Controlling and adjusting of the operation of a device actuated by an electric motor are carried out by shutting down the electric power supply of said electric motor at a plurality of time intervals during the motor operation, measuring in the time interval the voltage supplied by the electric motor, comparing the value of the measured voltage with a reference value and, if required on the basis of said comparison, varying at least one parameter related to the functioning of the device in order to compensate possible deviations.

11 Claims, 3 Drawing Sheets

APPARATUS AND PROCESS FOR CONTROLLING AND ADJUSTING THE OPERATING OF ELECTRIC MOTOR ACTUATED DEVICES

FIELD OF THE INVENTION

The present invention relates to an apparatus and a process for controlling and adjusting the operation of devices actuated by electric motors. More particularly, the invention relates to an apparatus and a process for controlling and regulating the operating parameters of pumps, impellers, screw conveyors, fans, rotors or similar devices operated by electric motors in small electric machines such as household appliances and machines for preparing and dispensing food and beverage e.g. those known as vending machines and HoReCa machines.

TECHNICAL BACKGROUND

In the above devices, electric motors are used to transform electric energy into mechanical energy. Usually electric motors are provided with a rotor secured to the drive shaft and the rotating elements are directly or indirectly coupled to the motor drive shaft. By applying an electric voltage to the motor, a rotary motion is transmitted to the rotor that transfers motion to impellers, pumps, rotors, screw conveyors, blades or equivalent devices. Electric motors are e.g. used for operating the pumps which supply water to a hydraulic circuit, for rotating the impellers of pumps or fans, to operate rotative heat exchanger, mixers etc. In many cases it is required to control and adjust operation of the devices coupled with electric motors by way of monitoring the number of revolutions. In other words, it is often necessary to know the speed of rotation of the element operated by the electric motor. Monitoring of the rotation speed allows for setting a proper adjustment of the operated device or allows for controlling its regular functioning. The reasons which lead to undesired variations in the rotation speed of the operated device may be different. For instance the rotation speed of the rotor of a hydraulic pump, initially set to a reference value, may change due to a variation in the resistance of the related hydraulic circuit, for instance because of a valve along the circuit that is not properly regulated, or due to the build up of scale or debris at the rotor bearings.

Traditional control and adjusting systems make use of speedometers (mechanical, electronic, optical, etc.), encoders, stroboscopes, etc. for sensing the angular velocity of the devices operated by the related electric motor. This type of instruments provides an output signal proportional to the measured value of the angular speed of the shaft to which they are applied.

Traditional control and adjusting systems are difficult to assemble on the rotating parts, complicated to calibrate and in some cases easily damaged; they are cumbersome and, thus, it is necessary to provide room for their assembling on a shaft or on a rotating element. Moreover, their proper functioning has to be periodically verified.

In some applications, e.g. in beverage dispensing machines the pumps operated for circulating water or other alimentary fluids, such as syrups, must have low costs and reduced dimensions. In these machines the water supply to the distribution circuit is usually carried out by a pump which comprises an impeller immersed in a reservoir containing water. When, as it is very usual for this type of pumps, the rotation speed of the impeller decreases due to a build up of scale and deposits within the respective bearings, the amount of fluid, e.g. water or syrup, supplied in a given amount of time (e.g. 10 seconds) by the pump, is lower than the optimal value for the same dispensing time, the consequence being negative changes in the organoleptic characteristics of the beverage.

Therefore there is the need of a system for controlling and adjusting the impeller operation in the aforesaid case and, generally, for controlling and adjusting the operation of a device operated by the motor in order to compensate for undesired variations in the operating parameters, such as angular velocity of the driving shaft, and ensure the correct functioning of the operated device.

JP-A-62213594 discloses a process and a device for smoothly restarting an AC motor after a power interruption that provide to measure the residual voltage of the motor during free rotation and to operate a set switch when said residual voltage value becomes a predetermined value or lower to restart the motor with the help of an inverter. JP-A-6098594 discloses a similar system. JP-A-6070593 also discloses a similar system, further comprising means to control the power feeding when residual voltage is zero.

SUMMARY OF THE INVENTION

It is an object of the present invention to solve the above mentioned problem by providing a process and an apparatus for controlling the operation of devices operated by electric motors which obviate the drawbacks of the known systems in a simple and effective way, the apparatus providing minimum size without the need for complicated wirings. The process and the apparatus according to the present invention are for permitting the effective control and adjustment of pumps, impellers, screw conveyors, fans, rotors or similar devices operated by way of electric motors, in particular within machines intended to prepare and/or distribute food and beverages.

It is another object of the present invention to provide a process and an apparatus for controlling and adjusting rotating devices operated by electric motors which allow for sensing of the angular velocity of the device rotated by the motor and which permit the feedback control of the same motor on the base of the value of the measured velocity.

It is also an object of the present invention to provide a process and an apparatus for effectively, simply and reliably controlling and adjusting machines for dispensing beverages or food (also ready-made food), which machines are provided with devices operated by electric motors.

The process according to the present invention provides that the motor rotating the device to which it is coupled, for instance an impeller, is temporarily shut down at least once for a preset time interval, which can be defined as "blackout time", while operating the device. In other words, the motor is not supplied with the power necessary for its operation while operating it to perform a required task, e.g. pumping water to a boiler. During the blackout time the motor operates as a voltage generator: its rotor keeps rotating (with a "residual rotation") together with the device to which it is coupled.

The electric voltage generated by the residual rotation is a measure of the rotation speed of the motor driving shaft and is indicative of the angular velocity of the device coupled to the motor. During the step of shutting down the power supply, the motor runs as a voltage generator. The voltage supplied by the motor is indicative of the number of revolutions (per minute) of the rotor. In other words, by measuring the voltage generated by the electric motor, the rotor speed of rotation is detected and, thus, the angular velocity of the motor shaft is detected, which is usually an integral part of the rotor. Measuring of the angular velocity is implemented for adjusting at least one operating parameter of the motor and/or of the installation (or machine) wherein the motor operates. Moreover, by measuring the speed of rotation at discrete time intervals, which may be regular or irregular, it is possible to implement a diagnostic control over the operation of the motor and the respective installation. The skilled person will understand that controlling and adjusting the electric motor and the related installation (or machine) may be achieved real-time during the operation, i.e. it is possible to carry out the process according to the present invention at preset time intervals (for instance when the machine is switched on and once or more times per day) or continuously during the operation of the machine (i.e. the process is carried out during the whole operating time of the machine).

The measure of the rotor speed of rotation provides useful information to verify the proper functioning of the motor and, in general, of the apparatuses provided with motors for operating pumps, screw conveyors, impellers, etc. For example it is possible to verify if the resistance to rotation of the shaft bearings is within the correct design parameters. In other words the process according to the present invention allows for the implementing of a diagnostic control of the functioning of the electric motor and the device to which it is coupled.

The process according to the present invention provides the step of adjusting the operation of installations, machines, dispensers, etc., provided with electric motors for actuating such devices. Adjustment is carried out on the basis of the comparison of the values of the residual voltage measured during the blackout time with values memorized in a CPU or similar computer means. If there is a difference, operating parameters are modified to compensate said difference or a warning and request for maintenance is generated.

According to a preferred embodiment of the invention, the residual voltage values are transformed into angular velocity values and the comparison step is carried out on measured and memorized angular velocities values.

For example, the process according to the invention is carried out for the adjustment of an electric motor coupled to an impeller which supplies water into machines for the preparation and dispensing of beverages such as coffee, cappuccino, tea, etc. When the measure of the residual voltage generated by the electric motor during the motor blackout time has been carried out, the process provides the step of adjusting the motor (or the motors) of the dispensing machine on the basis of the result of the comparison of corresponding values of the angular velocity with memorized values to check the possible difference in values. For instance, the motor speed (rpm) or the operating time may be changed.

In other words, the process provides a feedback adjustment (in real-time) of the electric motor carried out on the basis of the measured value of the voltage generated during the shutdown of the motor power supply and, then, on the basis of the value of the speed of rotation. Alternatively, or together with the feedback control over the motor, it is provided a feedback control over the power generator which supplies the motor, i.e. it is possible to modify the supply voltage of the same motor. In this way it is possible to control and adjust, for instance, the machine for preparing and dispensing beverages, in such a way that possible variations of the operating parameters with respect to preset values are compensated.

Among the parameters which can be adjusted there are, for instance, the motor rpm, the torque, the power, the operating time, the stop time, etc. Adjusting of the motor may be achieved also indirectly, for example by acting on the valves of the hydraulic circuit wherein a pump operates which is actuated by the electric motor in such a way that the fluid flow rate within the circuit is set consequently.

The present invention also concerns an apparatus according to claim 7. The apparatus comprises means for temporarily cut the power supply to the motor and a voltage measurement device for sensing the voltage provided by the motor, during a power interruption time t, and a control unit for comparing the measured values with at least one memorized value.

The means for temporarily shutting down the power of the electric motor may comprise, for example, a transistor. The transistor is preferably adjusted by way of a timer.

According to an embodiment of the apparatus, the voltage measurement device comprises a voltmeter. Alternatively the voltage measurement device is an electronic circuit. The voltage signal detected by the voltage measurement device, for instance the voltmeter, may be processed directly or, preferably, upon being conversed into a digital signal. This may be carried out by providing the apparatus with an analog/digital A/D converter.

The control unit has the function of managing the means for shutting down the power and the voltage measurement device and of processing the voltage signal provided by the related measurement device. In a preferred embodiment, the control unit is set to transform, in a way known per se, the measured voltage values into corresponding angular velocity values, to compare them with reference value(s) and on the basis of the difference between such values to adjust the electric motor operating parameters. E.g. it adjusts the electric motor rpm, or the supplied mechanical power, the torque, the motor operating time or non-operating time, etc.

In the following description reference will be made to the non-limiting example of an impeller for the circulation of water within machines for the preparation of coffee (dispensing machines). The impeller is subject to wearing, build up of scale sediments and debris at the respective bearings, and other drawbacks which cause increasing in the resistance against rotation. The process and the apparatus according to the present invention allows for adjusting the speed of rotation of the impeller in such a way to compensate the above negative effects and to supply the proper water rate/amount. Thus, the invention process and apparatus permit to control and adjust the machine provided with the impeller, for instance by keeping constant the dispensing time through increasing the rpm or, vice versa, by increasing the operating time in order to compensate for the lower rpm. In this way the water rate or amount which the impeller supplies for the preparation of a coffee dose remains optimal in time.

The shorter the time interval for implementing the process (during the motor residual rotation) and for the measuring of the generated voltage is, the more precise is the computation of the residual tension and resulting angular velocity of the rotor and/or the device actuated by the electric motor with respect to the velocity corresponding to the powered motor. Referring to the above discussed motor coupled to an impeller, when the motor is disconnected from the power supply the impeller continues rotating due to its inertia, but slows down due to the drag generated by the liquid in which it is immersed. To minimize the effect of the liquid on the residual tension, the power interruption time, i.e. the blackout time, is preferably within the range of 0.1 to 50 msec, preferably 0.8 to 2.0 millisecond and usually of about 1 millisecond. In other words the duration of the proper time interval for implementing the process is minimized in order to minimize the offset between the angular velocity detected according to the invention and the angular velocity corresponding to the motor regularly powered.

The value speed of rotation is calculated starting from the measured value of the voltage on the basis of the characteristic curve voltage/motor rpm in a specific working condition. According to such characteristic (curve) it is then possible to combine a value of the voltage with a precise value of the speed of rotation and vice versa. For each type of motor and for each specific application, the characteristic curve, if not available from the producer, can be defined by way of laboratory tests providing a series of values which describe the characteristic curve, i.e. the curve which contains the "reference value" cited in claim 1.

Such tests may be carried out, for instance, with the unpowered motor drawn into rotation by an impeller at different set rotation speeds. The characteristic curve obtained in this way may be defined as for the "unpowered motor". With this measuring system a direct correspondence is obtained between the measured value of the voltage and the rotation speed of the impeller (which is known because is preset). These tests practically define the characteristic curve of the motor during its functioning as generator.

The characteristic of the unpowered motor may also be obtained by actuating the device at different operating conditions with the impeller immersed in water and by measuring the voltage generated when the motor is shutdown, i.e. by acting according to the process on an apparatus in optimal conditions (i.e. standard conditions) when the speed of rotation (rpm) is known, for instance when it is measured. By repeating the measuring of the voltage after the shutdown, under the same other conditions but at d motor rpm, the desired characteristic curve is obtained.

Alternatively, the voltage/rpm characteristic curve of the motor may be detected when the motor is powered and rotates an impeller immersed in water (or another liquid, in the desired final operating conditions): the characteristic is detected by powering the motor with different voltages and by measuring the velocity corresponding to each voltage supplied to the motor. The characteristic curve detected in this way may be defined as for the "powered motor". Such characteristic (curve) may be corrected to take into account the impeller deceleration which occurs during the motor shutdown and the corresponding decreasing in the voltage value.

Processing of the voltage signal on the basis of the "unpowered motor" characteristic or the "corrected" characteristic comprises the step of comparing the measured value of the speed of rotation with a reference value. The difference between such values is taken onto account for adjusting the electric motor when its powering is reestablished.

The power interruption and residual voltage detection steps are preferably carried out repeatedly during the operation of the device.

The invention has a number of advantages. For instance it permits to evaluate the speed of rotation of an electric motor shaft rapidly and in a simple way, independently on the motor type, and permits to adjust or compensate possible offsets from preset values continuously, i.e. during the whole operating time of the machine, by acting on the speed or other machine operating parameter in order to achieve the desired performance. In fact the process is suitable to all the electric motors which may operate also as voltage generators. Moreover the process and apparatus result in minimum costs since the apparatus can be assembled with inexpensive devices, with no need for expensive instrumentation to be coupled to the shaft as instead provided by the traditional systems.

Another advantage of the invention with respect to the prior art is that the evaluation of the angular velocity of the device coupled to the electric motor is achieved with no need for providing outer elements on the device rotor. This allows for minimizing the size of the device rotor.

A further, relevant, advantage of the present invention is that the angular velocity of the device operated by an electric motor may be remotely detected, with no need for interfacing external instrumentation to the same device. This may be particularly useful when the operated device runs in an aggressive or "protected" environment. Remotely controlling and adjusting the device are achievable in a simple and effective way.

The process and the apparatus according to the present invention may be used in many technical fields. In general the process and the apparatus according to the present invention may be applied in all cases wherein the electric motors and the devices to which they are matched are not subject to frequent maintenance cycle. The process and the apparatus are particularly useful when applied in the field of the machines for dispensing beverages and in particular for actuating the pumps intended to circulate water or the fluid used for preparing the beverages. The process and the apparatus may be also used in association with the electric motors of household appliances, snack dispensers, or in general, in association with the motors used in (ready-made or not) food distributors, screw conveyors for ice, etc.

The process and the apparatus according to the present invention also permit to implement a self-diagnosis feature, i.e. they permit to check if the electric motor is connected or not to the related load, or if the motor is out of order. When there is no load provided, under the same other conditions, the speed of rotation of the motor is higher than the speed corresponding to a load being operated, for instance the speed may remain almost constant for a long time lapse after shutting down. In this case the measured voltage does not decrease to the initial value, but remains practically unchanged since the motor shaft is not decelerated by the load. The process and the apparatus also permit to check if the motor or the related load are blocked, for instance due to seizing or jamming, or due to a motor failure. In this case the detected voltage is steady in time, i.e. it does not decrease from an initial value, for instance the voltage may be constantly zero. An alarm signal is always generated when, due to the aforesaid reasons, the functioning of the motor and/or the load does not match with the proper parameters.

Electric motors are also used for transmitting translational or rotational-translational motion, etc. For sake of clarity, henceforward reference will be made to the case wherein the motion transmitted by the motor to the coupled device is rotational. The skilled technician will understand that the present invention can be implemented independently upon the motion type transmitted by an electric motor to the device coupled to the same.

SHORT DESCRIPTION OF THE DRAWINGS

Further aspects and advantages of the present invention will be discussed more in detail with reference to the enclosed drawings, given by way of non-limiting example, wherein.

EMBODIMENTS OF THE INVENTION

Figure 1:
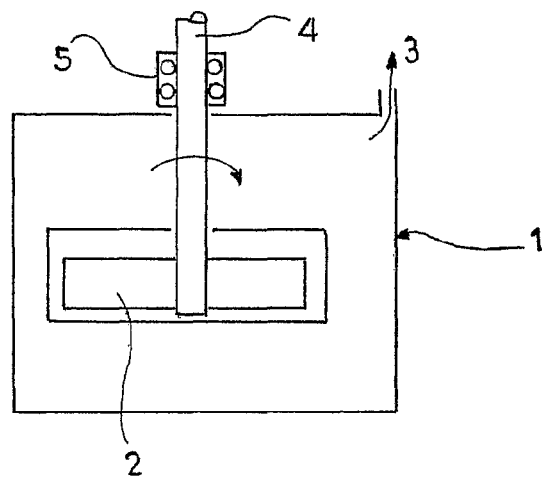
FIG. 1 is a scheme of a pumping circuit for beverage dispensing machines.

FIG. 1 schematically shows a water pumping unit of the type used in the machines for dispensing coffee. An impeller 2 is housed within a water container 1 for pumping water through outlet 3 of container 1. The impeller 2, for instance of the type having fixed radial blades, comprises a shaft 4 supported by bearings 5. The shaft 4 is rotated by an electric motor (not shown) of a known type. Scale deposits in correspondence of bearings 5, the blades of impeller 2 or in correspondence of outlet 3 cause an increase of the resistance exerted by the impeller 2, i.e. the load which the electric motor has to move increases. This results in the need for monitoring the speed of rotation of impeller 2.

Figure 2:
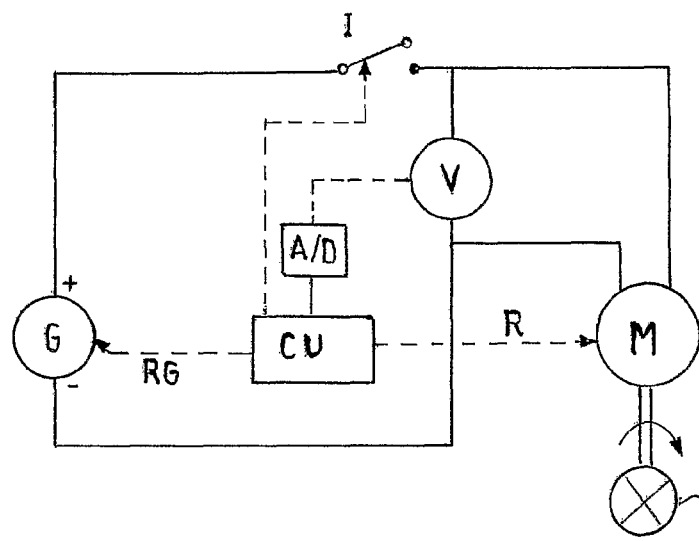
FIG. 2 is a scheme of a first embodiment of the apparatus according to the present invention.

FIG. 2 shows the electric scheme of a possible drive system for a motor M which rotates a load C, for instance through a rotating shaft directly coupled to the shaft of motor M. The motor is powered by a generator G. Advantageously the apparatus comprises means I having the function of cutting off the power of the motor M for a preset time interval $t_1$.

In the embodiment shown in FIG. 2, the means for blocking the power of the motor M are schematically shown as a switch I (in FIG. 2 it is open). When the means I cut off the power, the shaft of the motor M continues to rotate by inertia. The load C may be the impeller shown in FIG. 1, or a pump for alimentary fluids, a screw conveyor for ice, etc. Load C continues to rotate due to the inertia, for instance if the load C is the impeller 2, this may continue to rotate for a certain time before the resistance exerted by the water stops it. In general, it can be assumed, for the purpose of the present invention, that in the first time instants following the shutting down of generator G the shaft of motor M rotates at the same speed corresponding to the functioning of the motor M being powered.

During the power interruption time $t_1$, when the motor is not powered, motor M runs as a voltage generator and supplies a voltage at the motor statoric windings, which voltage is proportional to the speed of rotation.

The invention apparatus comprises a voltage V measurer, for instance an electronic circuit dedicated to this task, in order to measure the residual voltage generated by motor M during the shutdown, or blackout, time $t_1$ because of the drive shaft and device residual rotation.

As previously mentioned, each motor blackout or interruption time, i.e. each single time $t_1$, is preferably within the range of 0.1 to 50 msec, preferably within 0.8 to 2.0 msec. According to a preferred embodiment of the invention, power interruptions and resumptions are repeated several times during the operation of the motor driven device. This means that while the (e.g.) impeller 2 is operated, there will be a plurality of power interruption times $t_1$-$t_n$. The interruption times can be periodically repeated or carried out at different timings.

The sum of the blackout (interruption) times, $\Sigma t_1$-$t_n$, is a percent of the total operating time of the device, i.e. a percent of the sum of the time periods in which the motor is actually fed with power and the above mentioned sum of interruption times $\Sigma t_1$-$t_n$. This percent value is within the range of 1% to 50% of the total operating time of the device, preferably within 8% and 20% and most preferably about 10% of the total time. In other words, to have a 10% value of the sum of interruption times, the power will be cut off 1 msec every 10 msec, in the remaining 9 msecs the motor being connected to the power source and normally operated.

The apparatus comprises a specific control unit CU, e.g. a CPU or any other suitable means, to compare the value of the measured voltage with the "expected" voltage value (or reference value) under the same operating conditions. The characteristic voltage/motor M rpm for the device taken into account are memorized in the control unit.

In the herein discussed embodiment, i.e. the case of motor coupled to an impeller (FIG. 1), the supplied-voltage/rpm ratio values to be used as reference values can be obtained in several ways known in the art. For instance, they can be obtained by carrying out a plurality of tests with the motor functioning as a generator operated by the impeller 2 at different speeds of rotation. The characteristic obtained in this way may be defined "at unpowered motor". Alternatively the characteristic voltage/motor-rpm can be obtained with the powered motor operating the impeller 2 being immersed into water. The characteristic obtained in this way may be defined "at powered motor".

During the motor M shutdown the impeller 2 decelerates and the voltage supplied by the motor decreases. Therefore, it is preferable to take into account the lowering of the voltage in order to detect the right angular velocity. For this reason the process can make use of a "corrected" characteristic, i.e. a characteristic which takes into account the reduction in the voltage caused by the motor M shutdown. The corrected characteristic can be determined by starting from the characteristic at powered motor and by means of suitable conversion factors or tests.

For example, if the motor is normally powered with a voltage of 24 Volts and the load C rotates at 500 r/min, during the shutdown time of the motor M the value of the detected voltage may be equal to about 20 Volts. In this example the corrected characteristic will take into account the 4 Volts voltage reduction which depends upon the rotor deceleration. Correction of the characteristic can be carried out during the step of calibrating the apparatus by means of tests. On the basis of the memorized correction data, the control unit CU provides, as an output, a value of the speed of rotation of the rotor equal to 500 r/min, i.e. provides the corrected value corresponding to the speed of rotation when the motor is powered.

The difference between the corrected characteristic and the characteristic "at powered motor" decreases as the time interval for detecting the speed of rotation decreases to be negligible, with evident advantages for what concerns the measurement accuracy. In general the time interval for the shutdown varies depending upon the applications, i.e. depending upon the motor M and the load C "size". For many applications the time interval is comprised between 0.01-100 milliseconds.

During the motor M shutdown the supplied voltage may be measured once or rather several times. In this second case the measurements carried out are preferably processed by way of mathematical processes in order to reduce the deviations.

The voltage signal measured by the voltage measurement device V is input to the control unit CU which compares it with a memorized reference signal. Preferably the voltage signal is converted into a digital signal by means of an analog/digital converter A/D. The control unit, on the basis of the aforesaid comparison, determines the speed of rotation, or angular velocity, of driving shaft 4 and load C. If the detected velocity does not comply with the preset parameters for that particular application the control unit CU modifies the operational parameters of the motor M accordingly. If the control unit CU detects that the impeller 2 rotates at a lower rpm than the expected one, for instance due to an increasing of the frictions caused by the build up of scale within the bearings, the control unit will compensate this reduced speed by adjusting one or more operating parameters of the device. For instance, the control unit CU will increase the speed of rotation to compensate for the frictions and reestablish the preset speed of rotation. Alternatively or in addition, the time of operation of the impeller is increased.

Both the control and the adjustment are preferably carried out in real time, i.e. during the operation of the device C operated by the electric motor M. The apparatus according to the present invention configures also as a system for the diagnostics of electric motors and the devices to which they are coupled or the machines provided with such devices.

In case the motor M and the load C are coupled by means of gears, for instance adapters, the control unit CU will have memorized the transmission/reduction factors in order to take into account the angular velocity of the load and not only the one of the motor M shaft.

Figure 3:
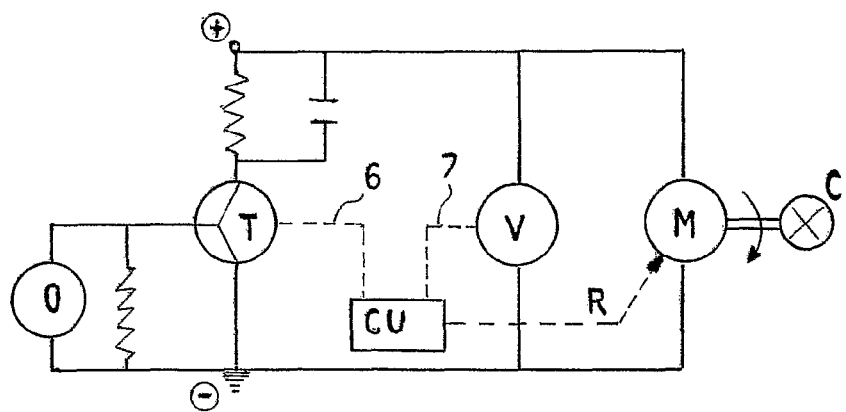
FIG. 3 is a scheme of a second embodiment of the apparatus according to the present invention.

FIG. 3 shows another embodiment of the apparatus according to the present invention for controlling and adjusting an electric motor M coupled to a load C. In particular, FIG. 3 is a simplified electric scheme of the apparatus. The means for temporarily cutting off motor M power supply comprise a transistor T controlled by an oscillator O. At regular or irregular time intervals the oscillator O makes the transistor open the motor M supply circuit, by impeding the current flow. The voltmeter V senses the voltage supplied by the motor M before the motor M power supply is reestablished.

The control unit CU has the further function of elaborating the measured voltage values by way of mathematical processes, if so required. For instance, if the apparatus provides for measuring the voltage value several time during the shut-down time, the control unit CU will compute an average of the measured values, the root mean square deviations, etc. In other words the control unit CU mathematically processes the measured values of the voltage in order to minimize the possible error propagations, or for statistical reasons or also for the post-processing and the sending of data to external remote units.

Figure 4:
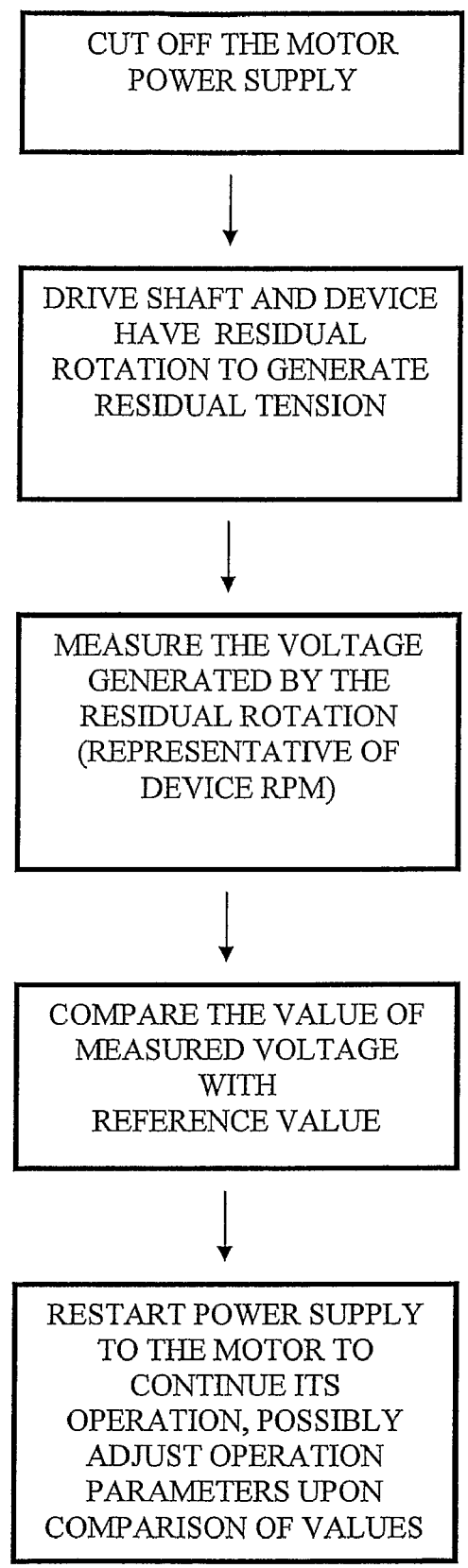
FIG. 4 is a flow chart of a process according to the present invention.

FIG. 4 is a block diagram which shows in a schematic way the steps of a process according to the invention. The steps of this embodiment of the process are the same as previously discussed, with the exception of adjustment step being carried out before resuming the supply of power to the motor, rather than after.

In general the apparatus and the process according to the present invention allow for carrying out an effective and quick feedback control over the functioning of the electric motor and the device coupled to the same. In fact, as it is shown in the FIGS. 2-4, the control unit can send a feedback signal R to the motor M in order to modify at least one operating parameter on the basis of the previously detected speed of rotation. For instance the control unit CU may require an increasing of the output supplied by the motor M (or the supplied torque) in the event that the speed of rotation of the device coupled to it, i.e. the rpm of the load C, is lower than a given threshold value (after comparison). Also, the control unit CU can adjust the torque supplied by the motor, the operating and/or the shut-down time, etc., by means of the signal R.

Alternatively, or in cooperation with the signal R and the control signal of the means I, the control unit can send a feedback signal RG to the voltage generator G. This feedback control may be easier to implement with cheaper devices with respect to the control over the motor M. The signal RG will modify the voltage supplied to the motor M. For example, in order to decrease the rpm of the motor M supplied with 24 Volts, the control unit can send a signal RG to the generator G to reduce the supply voltage to 22 Volts.

Figure 5:
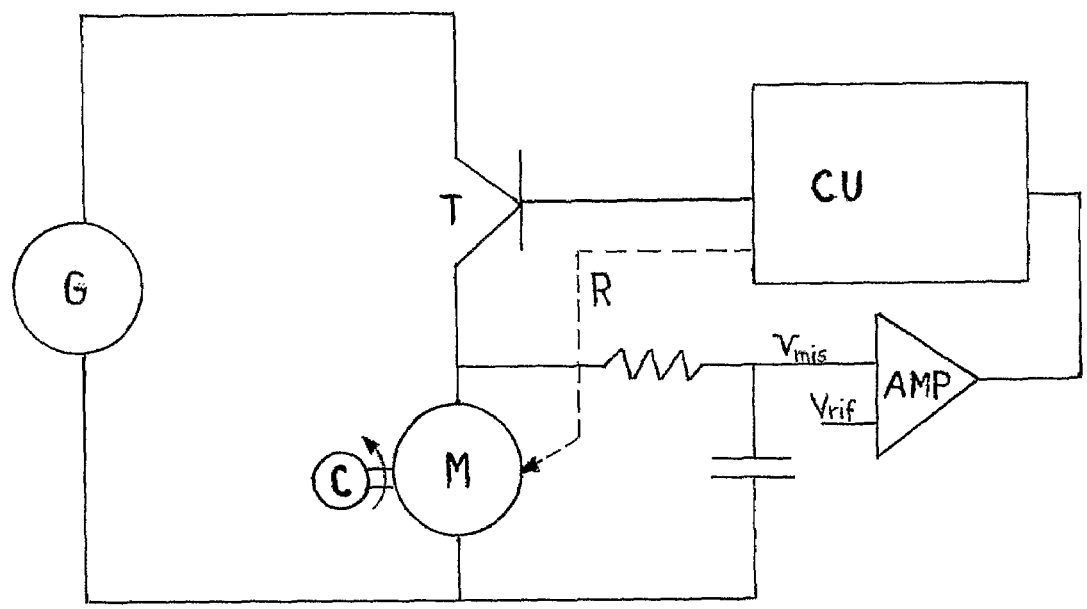
FIG. 5 is a scheme of a third embodiment of the apparatus according to the present invention.

The FIG. 5 shows a third embodiment of the apparatus according to the present invention. The signal $V_{MES}$ of the measured voltage generated by the motor and the signal $V_{RIF}$ of the reference voltage are input into an amplifier/comparator AMP. The difference (if any) between the values $V_{MIS}$ and $V_{RIF}$ is processed by the control unit CU wherein the characteristic voltage/motor M rpm may be stored. On the basis of the aforesaid difference the control unit CU sends a feedback signal R to adjust the powered motor M. Adjusting the motor M may affect its speed of rotation, the supplied torque, the power (output), etc. The control unit CU can be interfaced with other units of machines or installations wherein the motor M operates, so to allow for adjusting the machine or the installation.

Figure 6:
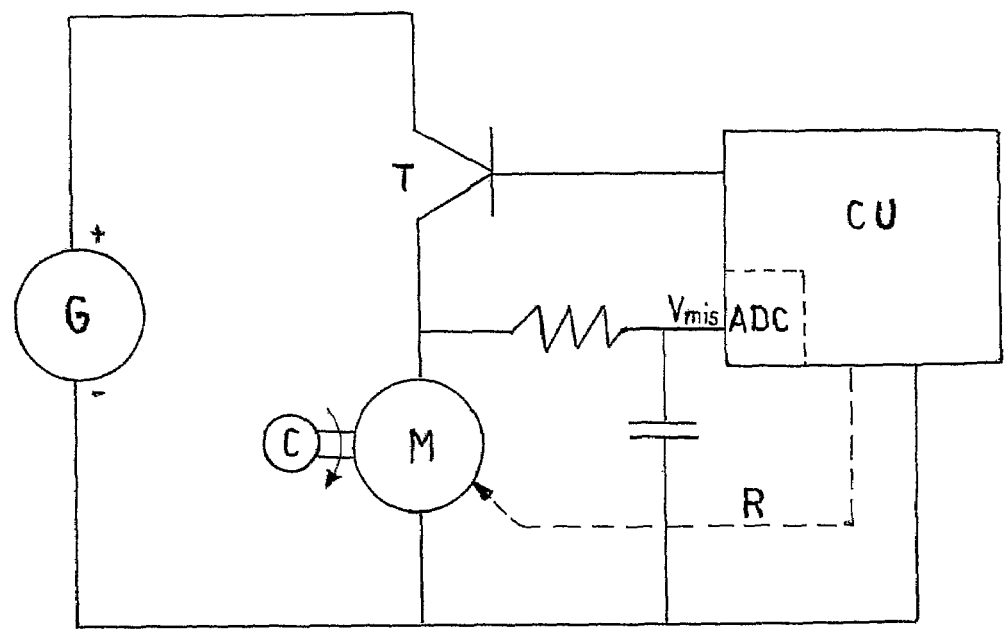
FIG. 6 is a scheme of a fourth embodiment of the apparatus according to the present invention.

The FIG. 6 shows a fourth embodiment of the apparatus according to the present invention wherein the control unit CU incorporates an analog/digital converter ADC for converting the voltage signal $V_{MES}$ from analogical into digital.

The apparatus and the process according to the present invention can be used also for carrying out a regular diagnosis of the electric motor M functioning. In fact, when the motor M is not coupled to an external device C, it is possible to verify the inertia of its rotor. In other words the apparatus and the process of the invention allow for checking if the rotor of the motor M rotates correctly, independently upon the coupling with the external device C. For instance, the apparatus shown in the drawings can measure the speed of rotation of the motor M rotor at regular time intervals, in order to check if the bearings operate properly and do not interfere with the rotation, for instance due to breaking of one or more of the guides of the same bearings, build up of external residues, seizings, etc. In this respect the process and the apparatus of the invention configure as a useful auto-diagnosis means of the motor M. The diagnosis may also comprise detecting of the load C, i.e. the process and the apparatus may also be used to check if the load C is coupled to the motor M, for example at the start of the same motor.

For instance, by means of the process and the apparatus of the invention it is possible to check if the motor M is jammed, for example seized, or if it runs properly. In other words the process and the apparatus permit to implement a diagnostic control over the motor M operation. If the motor M is blocked, for instance due to jamming of the load C or due to a failure, the supplied voltage is steadily zero. Moreover, by means of the process and the apparatus of the invention it is possible to check if the motor M is coupled to the related load C or not. When the motor M is normally powered but is not coupled to the load C, the speed of rotation of the shaft of the unpowered motor is higher than the reference value and remains almost constant for a long time, since no resistance is applied to the same shaft by the load. In this case the modified operating parameter is the sending of an alarm signal to indicate jamming/failure of the motor M (or of the load C) or rather to indicate that the load C is not coupled to the motor M.

It will be clear for the skilled person that motor M can operate a plurality of external devices. For instance the motor M may operate a hydraulic or pneumatic pump, an impeller of the type shown in FIG. 1, a screw conveyor for distributing a product, a pump for supplying an alimentary product within a circuit (for example a syrup or juice), a pump for circulating Freon gases (or the like) in a refrigerating circuit, a fan for extracting vapours or hot air from the environments or containers, etc.

In general the applications of the motor M and, thus of the apparatus and the device of the invention, are multiple in many technical fields. For instance the motor M can operate the helical shifters used within the automatic machines for distributing snacks or other ready-made foodstuffs. The motor M can operate a screw conveyor for ice in a machine for dispensing beverages, such as soft drinks or the like, etc.

The process and the apparatus according to the present invention are particularly useful for controlling and adjusting the functioning of the devices operated by electric motors, for instance used within household appliances or within machines for dispensing coffee, when the motors and the related devices are not subject to scheduled maintenance.

The expert in the field will understand that the apparatus and the process according to the present invention can also provide for detecting the electric current intensity through the statoric windings of the motor M. In fact also this measure can provide useful information about the speed of rotation of the rotor, even if the current intensity depends upon the design of the motor, in particular depends upon its impedance and thus it would be more difficult to analyze (i.e. the post-processing of the current intensity measures would be more difficult than the post processing of the data related to the voltage).

The invention claimed is:

1. A process of controlling and adjusting operation of a device actuated by an electric motor, comprising the following steps:
    (a) operating said device by means of said electric motor;
    (b) effecting power interruption by temporarily cutting off the supply of electric power to said electric motor for at least one interruption time ($t_1$);
    (c) measuring a value of voltage generated by said electric motor by virtue of residual rotation of a rotor of the electric motor during at least a portion of said interruption time ($t_1$);
    (d) subsequent resuming of the supply of electric power to said electric motor to continue the operating of the device for at least one period of interruption time (t1), the effecting power interruption and the subsequent resuming being repeated several times during the operating of the device;
    (e) comparing the voltage measured values with at least one reference value; and
    (f) modifying at least one of a plurality of device operating parameters for said device when necessary based upon results of said comparison.

2. The process according to claim 1, wherein steps (a)-(f) are repeated to control and adjust in real-time said at least one of the plurality of device operating parameters during functioning of the device through a plurality of interruption times ($t_1$ - $t_n$) and measurements.

3. The process according to claim 2, wherein each of the interruption times (t) is within a range of 0.1 to 50 milliseconds.

4. The process according to claim 3, wherein a sum of the interruption times ($\Sigma t_1$ - $t_n$) is within 10% to 50% of a total operating time of the device (2).

5. The process according to any previous claim, further comprising the step of detecting an angular velocity of said rotor or of the device coupled to said electric motor, by processing a signal related to the value of said measured value of the voltage.

6. The process according to claim 1 or 2, wherein said at least one device operating parameter is selected from a group consisting of rpm, torque, power, operating time, shutdown time, or any of their combinations.

7. An apparatus for controlling and adjusting operation of a device actuated by an electric motor, comprising means for
    effecting power interruption by temporarily cutting off an electric power supply to said electric motor,
    effecting subsequent resumption of the electric power supply after a period of interruption ($t_1$), and
    repeating the power interruption and the subsequent resumption several times during the operation of the device;
    voltage measurement means for measuring a value of voltage generated by the electric motor during the power interruption, a control unit configured to compare the measured value of the voltage with at least one reference value and, on a basis of possible difference between said measured and reference values, to send an adjustment signal to said electric motor in order to modify at least one operating parameter of said device.

8. The apparatus according to claim 7, wherein said control unit (CU) is set to repeatedly actuate said means for effecting power interruption by temporarily cutting off the electric power supply to the motor and said voltage measurement means.

9. The apparatus according to claim 7 or 8, wherein said means for effecting power interruption by temporarily cutting off the electric power supply comprise at least one transistor (T).

10. The apparatus according to claim 7 or 8, further comprising an analog/digital converter (A/D) for converting a signal indicative of the measured voltage.

11. A machine for preparing and/or or dispensing beverages or foodstuffs, characterized by the apparatus according to claim 7 or 8.

* * * * *